United States Patent [19]

Bachmann

[11] Patent Number: 4,582,296
[45] Date of Patent: Apr. 15, 1986

[54] COMPOSITE BLADE FOR DAMPERS FOR DUCTS OF LARGE CROSS SECTIONAL AREAS

[76] Inventor: Lothar Bachmann, R.F.D. #3, Auburn, Me. 04210

[21] Appl. No.: 708,071

[22] Filed: Mar. 4, 1985

[51] Int. Cl.[4] .................. F16K 3/312; F16K 3/314
[52] U.S. Cl. .................................. 251/326; 251/368; 251/250; 405/106; 138/94.3
[58] Field of Search ............... 251/326, 327, 368, 250; 138/94.3; 405/104, 105, 106

[56] References Cited

U.S. PATENT DOCUMENTS

| | | | |
|---|---|---|---|
| 713,622 | 11/1902 | Enyart | 251/326 X |
| 1,483,041 | 2/1924 | Brooks | 251/326 X |
| 2,208,394 | 7/1940 | Scherer | 251/368 X |
| 3,996,750 | 12/1976 | Brcar | 251/326 X |

FOREIGN PATENT DOCUMENTS

| | | | |
|---|---|---|---|
| 926063 | 4/1955 | Fed. Rep. of Germany | 405/106 |
| 107276 | 12/1924 | Switzerland | 405/104 |

Primary Examiner—Arnold Rosenthal

[57] ABSTRACT

A damper for ducts of large cross sectional areas has an upstream seat surrounding the flow path and a blade which consists of upstream and downstream skins of a high quality nickel allow steel and an internal reinforcement. The thickness of the skins is such that, given the size and shape of the seat, they are relatively flexible. The skins are welded to opposite sides of the reinforcement which is in the form of a grid or lattice of substantially the size and shape of the seat and both renders the skins rigid and establishes the wanted blade thickness. Members marginally of the grid and welded thereto are exposed to be operatively engaged by the mechanism by which the blade is reciprocated between positions permitting or blocking flow through the damper.

7 Claims, 11 Drawing Figures

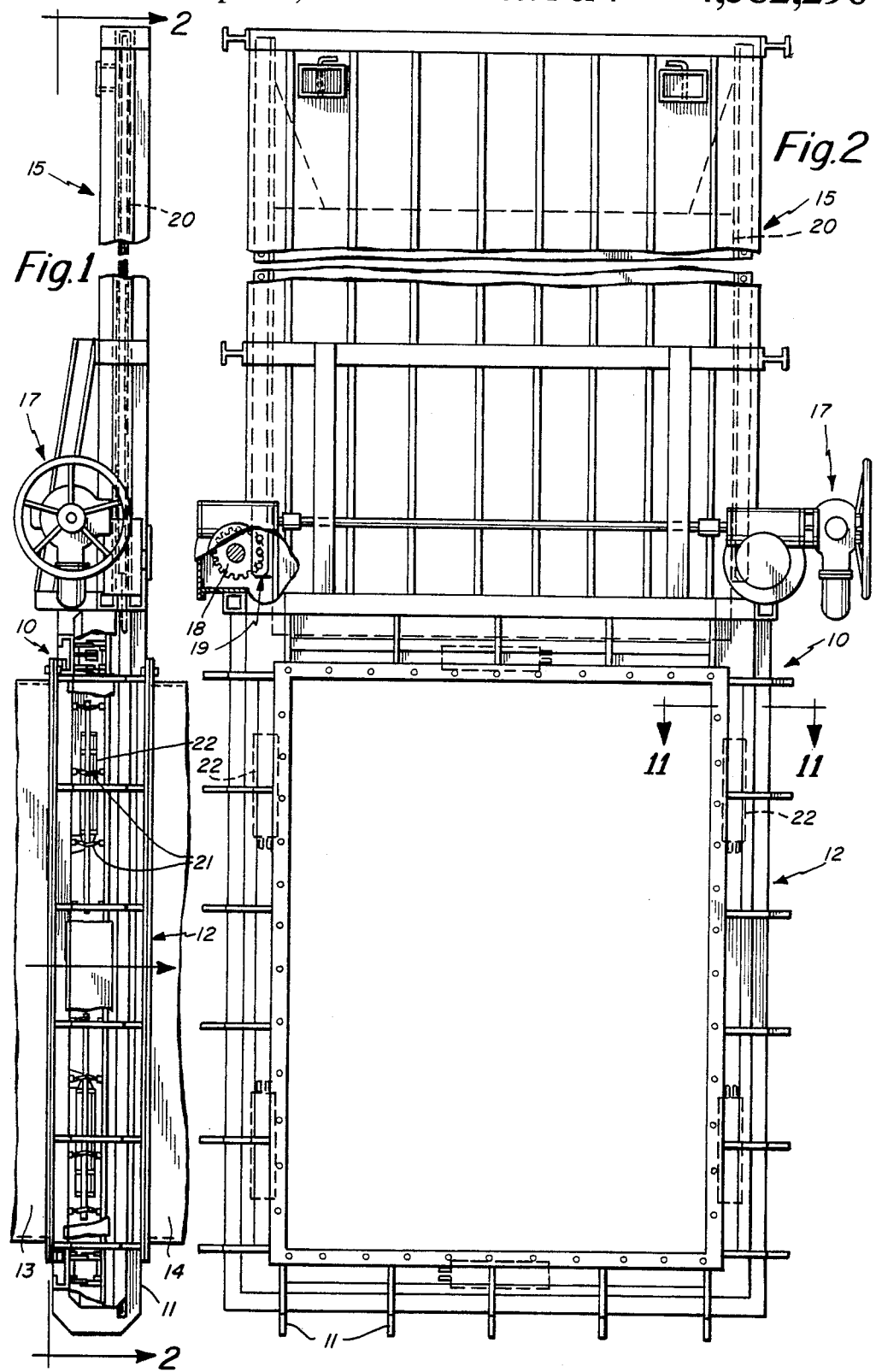

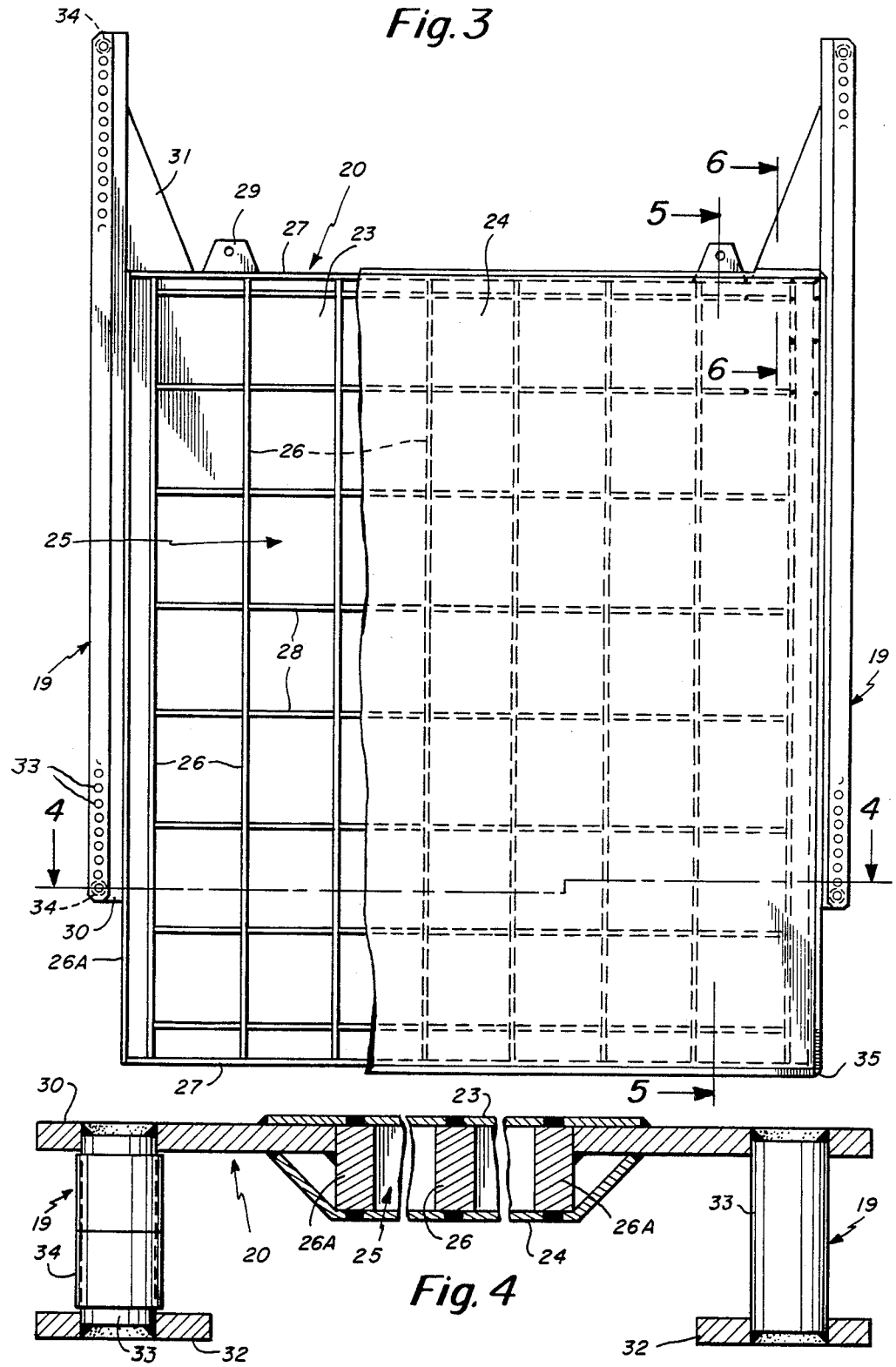

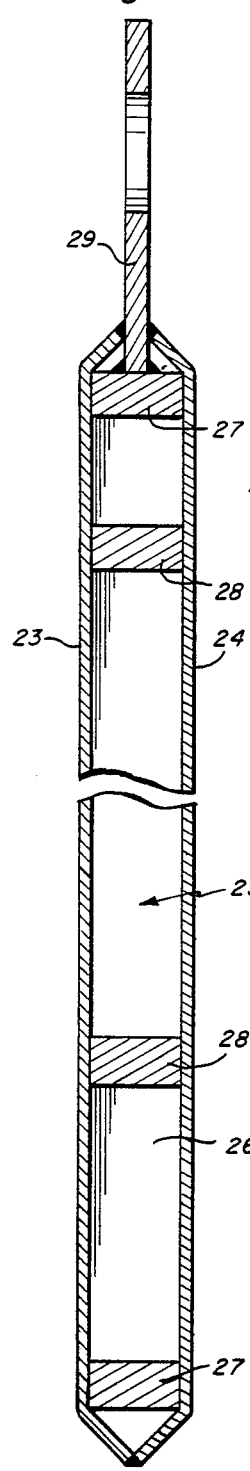
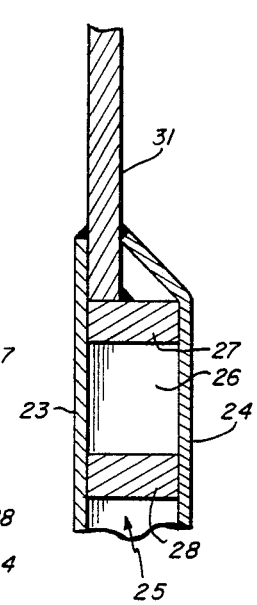
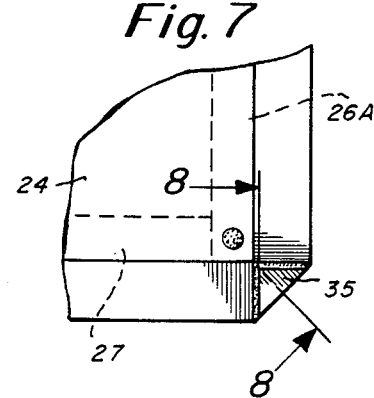
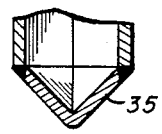
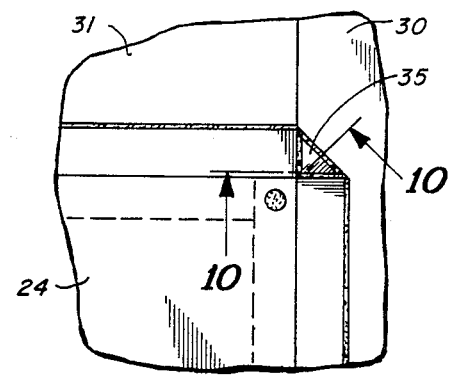
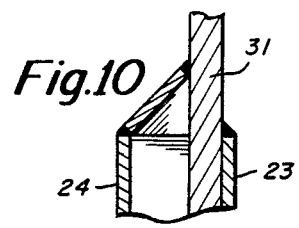

COMPOSITE BLADE FOR DAMPERS FOR DUCTS OF LARGE CROSS SECTIONAL AREAS

BACKGROUND OF THE INVENTION

In plants having duct systems in which gas processing equipment are incorporated, it is a requirement that such equipment may be isolated by dampers from the gas stream when servicing is required.

As the cross sectional dimensions of such ducts are large, the cost of such dampers is necessarily substantial particularly where the blades of the dampers must be of a high quality nickel alloy steel. The blades must meet certain functional requirements which depend on such factors as differential pressures and temperatures to which they are to be subjected as well as the nature of the hot gas streams and particles carried thereby.

By way of example, duct systems where the duct sections are fifteen feet by fifteen feet, require that damper blades of a high quality nickel alloy steel be at least one and five-sixteenth inches in thickness with a resulting blade weight of approximately 14,000 pounds and with a blade material cost, at the present time of about ten dollars a pound to the damper manufacturer, at least $140,000. In addition, such a blade has high transportation costs and requires that the cost of the mechanism by which such a blade is reciprocated between duct blocking and open positions be proportionally large.

THE PRESENT INVENTION

The present invention has for its primary objective the provision of damper blades which, as compared with solid blades of high quality nickel alloy steel, offer substantial economic advantages. In accordance with the invention, such a blade consists of surface metal skins welded to a metal grid, sometimes referred to as a lattice, with the components dimensioned to render the blade capable of meeting functional requirements with the weight of the blade less than a solid blade but with an increased assembly cost, avoided by such a solid blade, but which, when material such as high quality nickel steel is required, is inconsequential when compared with the large economies which result in material costs and from the savings in weight.

BRIEF DESCRIPTION OF THE DRAWINGS

The accompanying drawings illustrate a preferred embodiment of the invention and FIG. 1 is a side view of a guillotine damper equipped with a blade in accordance with the invention;

FIG. 2 is an end view thereof taken approximately along the indicated line 2—2 of FIG. 1;

FIG. 3 is a view of the face of the blade with the upstream skin partially broken away;

FIG. 4 is a section, on a substantial increase in scale, taken approximately along the indicated line 4—4 of FIG. 3;

FIG. 5 is a section on the same scale, taken approximately along the indicated line 5—5 of FIG. 3;

FIG. 6 is a section taken approximately along the indicated line 6—6 of FIG. 3;

FIG. 7 is a fragmentary front view showing one of the lower corners;

FIG. 8 is a section, on an increase in scale, taken approximately along the indicated line 8—8 of FIG. 7;

FIG. 9 is a fragmentary front view of one of the upper corners of the blade;

FIG. 10 is a section, on an increase in scale, taken approximately along the indicated line 10—10 of FIG. 9.

THE PREFERRED EMBODIMENT OF THE INVENTION

Figure 11:
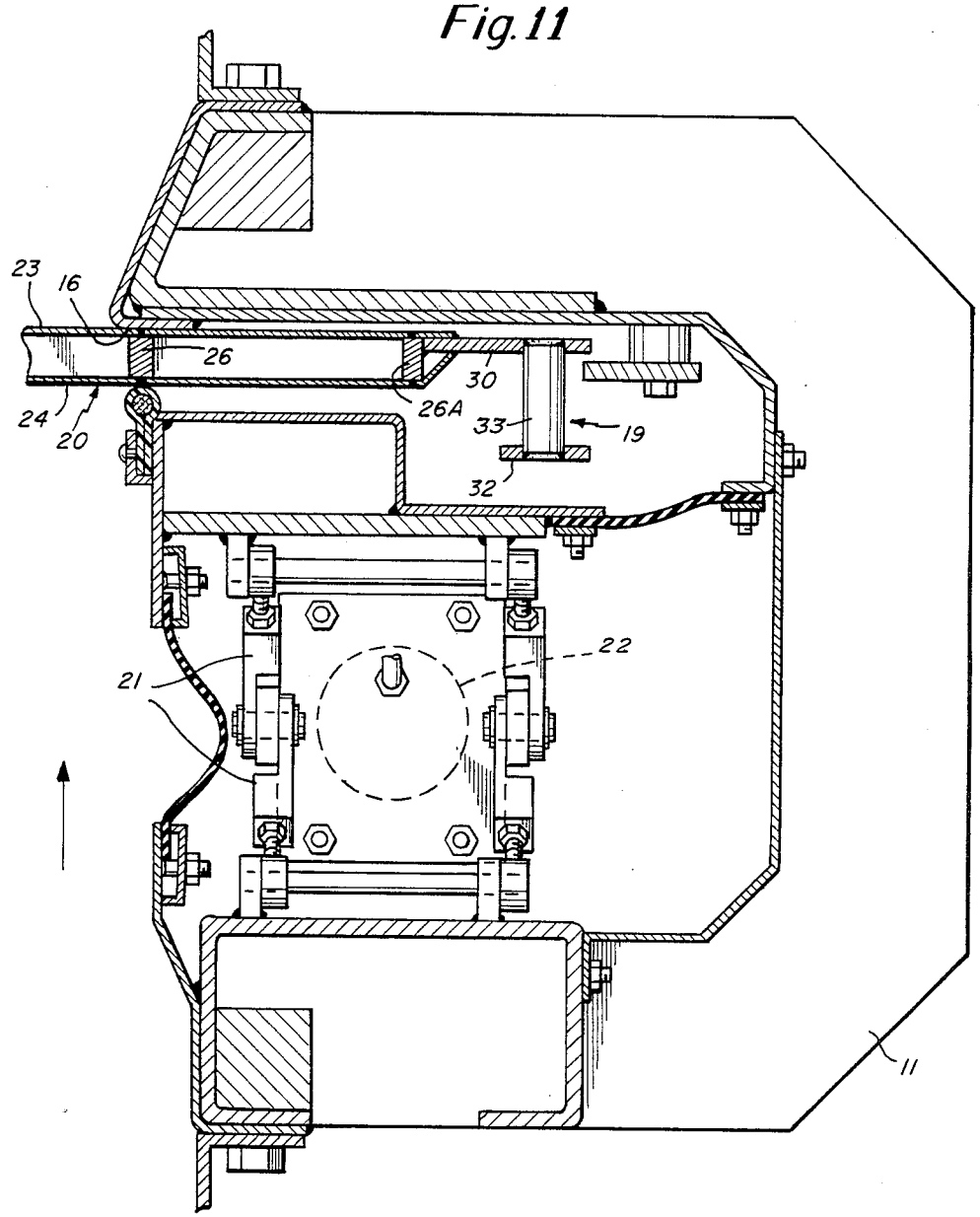
FIG. 11 is a section, on an increase in scale, taken approximately along the indicated line 11—11 of FIG. 1.

Such plants as coal fired, steam operated generating plants, paper mills, cement and incinerator plants have duct systems of large cross sectional areas in which gas processing equipment is incorporated and which require servicing from time to time. Such equipment is commonly incorporated in parallel sections of the duct system and each such section is provided with dampers upstream and downstream of the equipment in order that the equipment to be serviced can be so isolated that workmen can safely enter a section when its dampers are closed.

A guillotine damper is generally indicated at 10 in FIGS. 1 and 2 and is in the form of a chamber supported by base structure 11 and having a main section 12 to which upstream and downstream duct sections 13 and 14, respectively, are connected, and a bonnet section 15. As the construction of the damper 10 forms no part of the present invention, it will not be described other than to note that the main section 12 is provided with an upstream seat 16 surrounding the flow path through the damper, see FIG. 11. Mechanism, generally indicated at 17 includes pinions 18, one on each side of the flow path through the damper for meshing engagement with the appropriate one of the racks generally indicated a 19 with which the generally indicated blade 20 is provided. The mechanism 17 is operable to reciprocate the blade 20 between an inoperative position within the bonnet section 15 and an operative position in which the blade 20 is lowered to block the flow path through the damper, the blade 20 then being held against the seat 16 as by toggle joints 21 under the influence of compression springs (not shown) and retracted by hydraulically operated means 22. For a detailed description of the damper illustrated by FIGS. 1 and 2, the above referred to blade reciprocating mechanism and the means for operating the toggle joints 21, see U.S. Pat. No. 4,327,893 incorporated herein by reference for that purpose.

In accordance with the invention, the blade 20 is of a composite construction and has downstream and upstream skins 23 and 24, respectively, each of a high quality, nickel alloy steel, in practice three-sixteenths of an inch in thickness, and an internal lattice or grid reinforcement, generally indicated at 25. As the size and shape of the skins 23 and 24 must be such that the skin 23 will at least overlie the seat 16 when the blade 20 is positioned to block the flow path and as the duct sections have a large cross sectional area, fifteen feet by fifteen feet, for but one example, skins of the indicated thickness are too flexible for sealing contact with the seat 16, without internal reinforcement in the form of a grid so constructed and dimensioned that the skins are rendered rigid and the wanted thickness of the blade is established when the skins are welded thereto. In practice, each skin consists of a plurality of strips of commercially available widths which are welded marginally together and finished to remove any rough spots and unevenness.

The internal reinforcement 25 consists of a series of vertical stiffeners 26 including marginal stiffeners 26A of the same length, top and bottom stiffeners 27 welded to the stiffeners 26 and 26A with each two stiffeners 26 interconnected by a series of short, transverse stiffeners 28. The stiffeners are preferably also of a high quality, nickel alloy steel and in cross section may be and desirably are on and three-quarters by three-quarters of an inch in width.

In practice, except at the margins of the blade, the spaces of the grid defined by the stiffeners 26 and 28 are rectangular and about twenty inches by twenty inches while in the top margin, the height of the spaces defined by the stiffeners 27 and the stiffeners 26 which are also rectangular may be about four inches and the height of the spaces marginally of the bottom margin, the spaces are approximately seven inches. The top and bottom margins of the skins, see FIG. 5, are inclined inwardly towards each other with their edges welded together except where lifting lugs 29 are welded to the top transverse stiffeners 27, in which case the said margins are welded thereto. In practice, the portions of the skin 23 backed by the line of transverse stiffeners next to the bottom stiffeners 27 and the vertical stiffeners 26 next to the stiffeners 26A engage the seat 16 when the blade 20 is operatively positioned to block flow through the damper.

The side margins of the skins overlie the outer vertical stiffeners 26A and have their outer edges welded together except where the bars 30 of the racks 20 are welded to said stiffeners, each rack bar 30 has its lower end spaced a substantial distance above the lower end of the blade 20 and its upper end extends well above the top upper end of the blade which has a brace 31 welded thereto and to the upper transverse stiffener 27. It will be noted that the rack bars 30 are welded to the outsides of the stiffeners 26A and the downstream skin 23 is welded thereto and held thereby in the plane of the remainder of that skin while the upstream skin 24 has its margins bent and welded to the opposite face of the rack bars, see FIG. 4.

Second rack bars 32 of the same length as the rack bars 30 are connected thereto on the upstream side of the blade 20 by a series of rack pins 33 which are of substantially greater length than the thickness of the blade and are vertically spaced in a manner appropriate for meshing engagement with the pinions 17 and in practice are provided with bearings 34.

The composite blade is completed by corner pieces 35 which seal the otherwise open ends of the skin margins at the bottom of the blade, see FIGS. 7 and 8, and it will be apparent that such blades are well adapted to meet production and use requirements where material costs otherwise present serious problems.

I claim:

1. A blade for a damper having an upstream seat surrounding the flow path through the damper and means operable to reciprocate said blade between positions in which said flow path is blocked and flow through the damper is permitted, said blade including upstream and downstream skins of a high quality nickel alloy steel, at least said downstream skin of a size and shape such that the margins thereof will overlie the seat when the blade is positioned to block the flow path, the thickness of said skins such that, given the size and shape of the seat, said skins are relatively flexible, and an intermediate reinforcement in the form of a grid, the marginal portions of which are of substantially the size and shape of the seat, said skins welded to the grid and thereby made rigid and the thickness of the grid such as to establish the wanted thickness of the blade but with the weight thereof substantially less than that of a solid steel blade that is thick enough to be rigid, and members marginally of the grid and welded thereto and exposed to be operatively engaged by said reciprocating means.

2. The blade of claim 1 in which the damper is of the guillotine type and the reciprocating means include pinions at each side of the flow path and the marginal side members of the blade include racks.

3. The blade of claim 1 in which the skins are of substantially the same size and shape and both protrude beyond the margins of the grid and the margins of the skins are welded together except in the locations of said marginal members where they are welded thereto.

4. The blade of claim 2 in which the skins are substantially the same size and shape and both protrude beyond the margins of the grid and the margins of the skins are welded together except in the locations of said marginal member where they are welded thereto.

5. The blade of claim 4 in which each of the marginal members is a first rack bar and there are second rack bars, one for each first rack bar and a series of pins rigidly interconnecting corresponding first and second rack bars and spaced apart lengthwise thereof to be operatively engaged by the appropriate one of said pinions.

6. The blade of claim 5 in which each first rack bar backs the appropriate margin of the upstream skin which is welded thereto and the downstream skin is inclined towards the first rack bar and is welded thereto.

7. The blade of claim 5 in which the length of the pins is substantially greater than the thickness of the blade.

* * * * *